US008640023B1

(12) United States Patent
Murray (10) Patent No.: US 8,640,023 B1
(45) Date of Patent: Jan. 28, 2014

(54) METHOD AND SYSTEM FOR PROVIDING HTML PAGE ANNOTATIONS USING AJAX AND JAVA ENTERPRISE EDITION

(75) Inventor: Gregory L Murray, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1328 days.

(21) Appl. No.: 11/484,236

(22) Filed: Jul. 10, 2006

(51) Int. Cl.
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl.
USPC .......... 715/232; 715/230; 715/231; 715/233; 715/256

(58) Field of Classification Search
USPC .......... 715/230, 234, 243, 256, 231, 232, 233
See application file for complete search history.

(56) References Cited

U.S. PATENT DOCUMENTS

| 5,790,435 | A  | * | 8/1998  | Lewis et al. ............ 715/255 |
| 6,571,295 | B1 | * | 5/2003  | Sidana ..................... 709/246 |
| 6,687,878 | B1 | * | 2/2004  | Eintracht et al. ......... 715/201 |
| 7,421,448 | B2 | * | 9/2008  | Spork ........................... 1/1 |
| 7,472,341 | B2 | * | 12/2008 | Albornoz et al. ........ 715/230 |
| 7,519,901 | B2 | * | 4/2009  | Price et al. .............. 715/233 |
| 2002/0078088 | A1 | * | 6/2002  | Kuruoglu et al. .......... 707/512 |
| 2004/0163042 | A1 | * | 8/2004  | Altman ........................ 715/512 |
| 2004/0172595 | A1 | * | 9/2004  | Lerner et al. ................ 715/512 |
| 2004/0205542 | A1 | * | 10/2004 | Bargeron et al. ........... 715/512 |
| 2004/0210833 | A1 | * | 10/2004 | Lerner et al. ................ 715/512 |
| 2005/0138541 | A1 | * | 6/2005  | Euchner et al. ............. 715/512 |
| 2005/0159882 | A1 | * | 7/2005  | Howard et al. ............. 701/200 |
| 2006/0015811 | A1 | * | 1/2006  | Tanaka et al. ............... 715/531 |
| 2006/0048047 | A1 | * | 3/2006  | Tao ............................... 715/512 |
| 2006/0080598 | A1 | * | 4/2006  | Bargeron et al. ........... 715/512 |
| 2006/0085735 | A1 | * | 4/2006  | Shimizu ...................... 715/512 |
| 2006/0136813 | A1 | * | 6/2006  | Hong et al. ................. 715/512 |
| 2006/0143560 | A1 | * | 6/2006  | Gupta et al. ................ 715/512 |
| 2006/0150079 | A1 | * | 7/2006  | Albornoz et al. .......... 715/512 |
| 2006/0224950 | A1 | * | 10/2006 | Takaai et al. ............... 715/512 |
| 2007/0061704 | A1 | * | 3/2007  | Simova et al. .............. 715/512 |
| 2007/0143694 | A1 | * | 6/2007  | Rakowski et al. .......... 715/760 |
| 2007/0294614 | A1 | * | 12/2007 | Jacquin et al. .............. 715/512 |
| 2008/0250311 | A1 | * | 10/2008 | Mitsufuji .................... 715/273 |

OTHER PUBLICATIONS

Garrett, Jesse James. "Ajax: A New Approach to Web Applications." Adaptive Path. Feb. 18, 2005 www.adaptivepath.com/publications/essays/archives/00385.php.*

* cited by examiner

*Primary Examiner* — Kyle Stork
*Assistant Examiner* — Nicholas Hasty
(74) *Attorney, Agent, or Firm* — Martine Penilla Group, LLP (57) ABSTRACT

A method and system for adding annotations to content of a webpage provided by a content server includes identifying a portion of the content of the webpage and applying an annotation to the identified portion of the content. The annotation is associated with the identified portion. The annotation and its association with the identified portion is saved on an annotations server and a link is generated to an annotated webpage wherein the content for webpage is received from a content server and the annotation is received from the annotations server. The link is sharable so as to enable others to view the annotation associated with the identified portion of the content.

17 Claims, 6 Drawing Sheets

METHOD AND SYSTEM FOR PROVIDING HTML PAGE ANNOTATIONS USING AJAX AND JAVA ENTERPRISE EDITION

BACKGROUND

1. Field of the Invention

The present invention relates generally to client-server computing systems, and more particularly to, a method and system for providing HTML page annotations on the client using AJAX.

2. Description of the Related Art

The Internet, also commonly referred to as the Web, provides a means for publishing documents (e.g. pages) and providing access to vast amounts of documents already published. A user may access a certain document on the Web and may want to share comments regarding the contents of the document with one or more users. A user, desiring to collaborate with a group of users regarding specific content of the document, has to do so by extracting the contents of the relevant document and sharing the contents with the group of users. This could be accomplished by accessing the document on the Web, scrolling down to the actual location of the specific content to be shared, extracting the specific content into a document along with a link to the webpage and sharing this document with other users through an email. The recipient(s) of the email will have to go to the webpage using the link provided in the document, scroll down to the location of the specific content, read the content and relate the content with the comments provided by the first user in the email. If the recipient needs to respond to the comments back to the first user or share his/her comments with the group of users, the recipient has to follow the steps outlined above and send the email with his/her comments back to other users including the first user. This sort of collaboration becomes cumbersome given the amount of the information available on the Web and length of some of the documents. Also, scrolling through pages of documents trying to locate the content is daunting.

In view of the foregoing, there is a need for a method and system that will overcome the aforementioned problems by providing a collaborating tool that can provide the user with greater flexibility to create, edit, and share comments about the contents of a document published on the Web, among a group of users.

SUMMARY

The present invention fills the need by providing an annotation tool for annotating portions of a webpage. The annotation tool is used to collaborate with other users by allowing a user to enter a comment to a specific portion of the webpage and sharing the comment along with the relevant portion of the webpage with other users. These annotations are associated with a specific portion of the webpage and use asynchronous requests to receive and load the annotations. It should be appreciated that the present invention can be implemented in numerous ways such as a system or a method.

In one embodiment, the present invention provides a method for adding annotations to content of a webpage provided by a content server. The method includes identifying a portion of the content of the webpage and applying an annotation to the identified portion of the content. The annotation is associated with the identified portion of the content. The method further includes saving the annotation and its association with the identified portion on an annotations server. A link is generated to an annotated webpage, the annotated webpage obtaining the content from the server and the annotation from the annotations server. The link is made sharable to enable others to view the annotation associated with the identified portion of the content.

In another embodiment, a computer implemented method for enabling addition of annotations to content of a webpage is provided. The method includes enabling application of an annotation to an identified portion of the content. The annotation is associated with the identified portion of the content. The method further includes causing the annotation and its association with the identified portion to be saved on an annotations server upon application of the annotation. A link is generated to an annotated webpage, the annotated webpage obtaining the content from the server and the annotation from the annotations server. The link is made sharable to enable others to view the annotation associated with the identified portion of the content.

In yet another embodiment, a system for enabling addition of annotations to content of a webpage is described. The system includes a client equipped with an annotation processor script, the annotation processor script being associated with the webpage. The annotation processor script is capable of identifying a portion of the content of the webpage, applying an annotation to the identified portion of the content wherein the annotation is associated with the identified portion. The annotation processor script is further capable of transmitting the annotation associated with the identified portion of the content to a server. The system further includes a server equipped with a server side component in the form of an annotation persistence store script (APS), the APS is capable of receiving the annotation associated with the identified portion of the content of the webpage from the client, saving the annotation and its association with the identified portion on an annotations server, and generating a link to an annotated webpage. The annotated webpage obtains the content from the server and the annotation from the annotations server. The link is made sharable to enable others to view the annotation associated with the identified portion of the content of the webpage.

The present invention, thus, provides a method and system for adding annotations to a portion of the content of a webpage and allows the sharing of such annotations with others.

BRIEF DESCRIPTION OF THE DRAWINGS

The invention may best be understood by reference to the following description taken in conjunction with the accompanying drawings. These drawings should not be taken to limit the invention to the preferred embodiments, but are for explanation and understanding only.

DETAILED DESCRIPTION

The present invention provides a tool for annotating portions of a webpage. The annotation tool is used to collaborate with other users by allowing a user to enter a comment to a specific portion of a webpage and to share the comment along with the relevant portion of the webpage with other users. Several embodiments for adding an annotation to selected content on a webpage are described. It should be appreciated that the present invention can be implemented in different ways such as a system or a method. It will be apparent to those skilled in the art that the present invention may be practiced without some or all of the specific details set forth herein.

To facilitate an understanding of the embodiments, the general architecture and operation of a client-server computing system will be described first. The process of the disclosed embodiments will then be described with reference to the general architecture.

Figure 1:
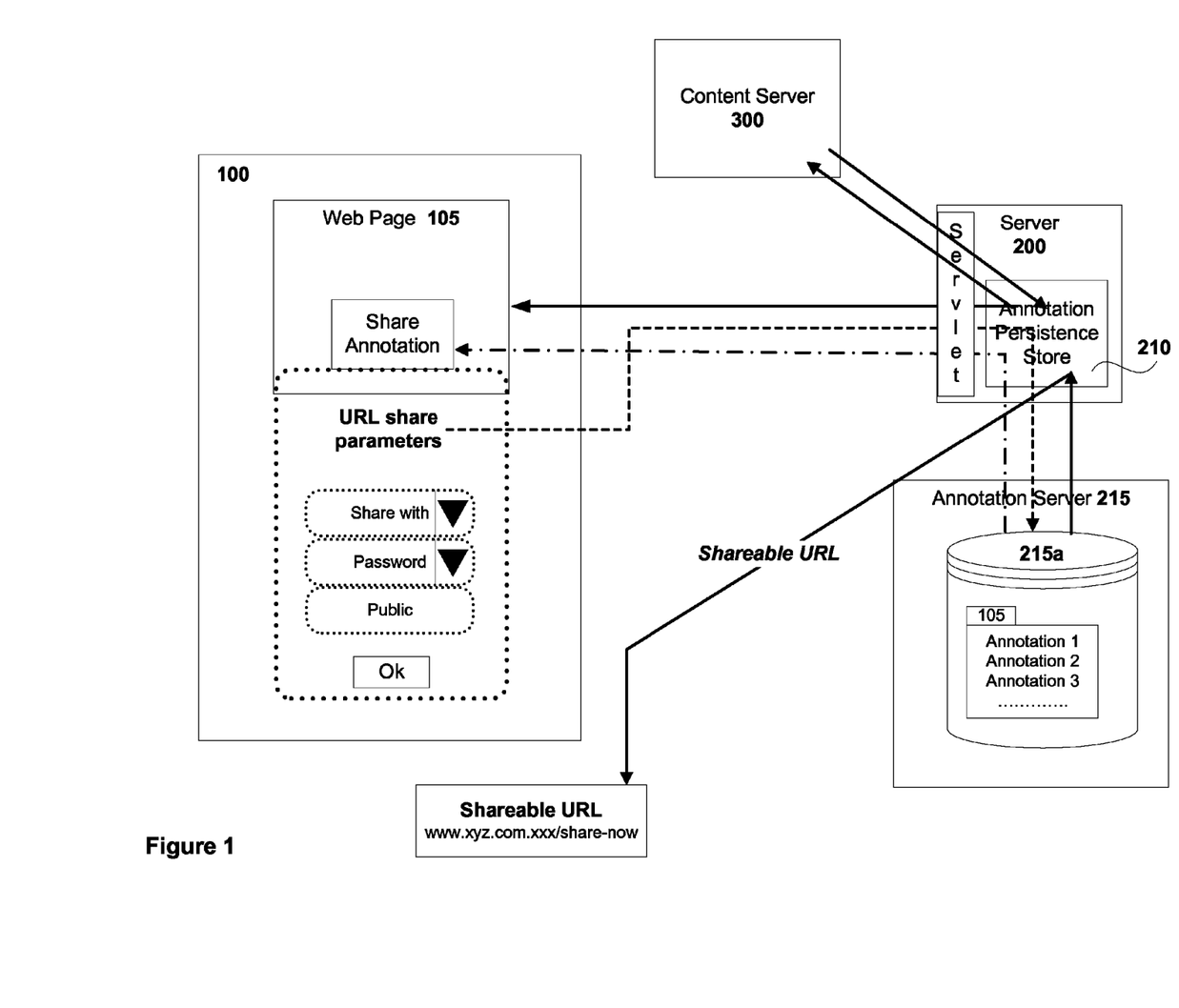
FIG. 1 illustrates an overview of a client-server computing system used in adding an annotation to a portion of a content of a webpage on a client, in one embodiment of the present invention.

FIG. 1 illustrates one embodiment of a client-server computing system wherein a plurality of computers or computing systems are interconnected using network connections (not shown). A client computer (client) 100 runs client software (referred to as a browser) and a server computer (server) 200 runs server software. The client 100 may include software in the form of an annotation processor script available to the browser. The annotation processor script may be an applet, a JavaScript or a custom script capable of interacting with the browser software and provides a user with a means to add, edit and share annotations to specific content of the webpage, when invoked. In one embodiment, the annotation processor script is enabled by installing a runtime script for the annotation processor script on the browser. In this embodiment, the annotation processor script provides an annotation tool which is made available when accessing any webpage on the browser.

A server 200, in the client-server computing system illustrated in FIG. 1, includes a servlet that is capable of receiving requests from various clients 100 and can direct these requests to one or more server runtime scripts or programs. As used herein, the term "script" should be broadly understood to include any type of program code which can be executed by one or more computing systems. The server 200 also includes a server-side component in the form of an Annotation Persistence Store (APS) 210 that receives requests related to adding and retrieving annotations to content of a webpage that maybe accessed through client 100. The APS 210 is a server-side component capable of interacting with the servlet software and provides a means to service requests related to annotations received from the client 100. In one embodiment, the APS 210 is a Java servlet that uses JavaServer Faces component with JavaServer Page tag library to generate a server-side JavaScript script (JavaScript) that enables an aspect of the page annotations. The APS 210 interacts with an Annotations Server 215 which is configured to store and retrieve annotations associated with the content of a particular webpage that is the subject of annotations or has been previously annotated. The Annotations Server 215, in one embodiment, is a database server storing annotation content related to one or more webpages in a database. The APS 210 also interacts with a content server 300. The content server 300, as used in this application, is any server that may publish or host a webpage that can be accessed over the internet. The content server 300 provides the content for a webpage requested by the client 100.

JavaServer Faces (JSF) used by APS 210 is a server side technology tool for developing rich user interface web applications. In accordance with one embodiment of the present invention, JavaScript logic is provided to enable the addition of annotations to content of a webpage and rendering of these annotations on the client 100 so as to enable sharing of these annotations with others that may want to see or collaborate on content of a webpage. In one embodiment, JavaScript is sometimes referred to in reference to the "ECMAScript". ECMAScript is available as "Standard ECMA-262: ECMAScript Language Specification", which is herein incorporated by reference.

A brief operational overview of an embodiment of the present invention is discussed with reference to FIG. 1. A more in-depth view of the invention will be discussed further along. A webpage 105 is requested by the client 100 from a server 200. There may or may not be any annotations associated with content of the requested webpage 105. The webpage 105 includes a script in the form of an annotation processor script 105T to enable adding and viewing of the annotations. In one embodiment of the invention, the annotation processor script 105T is embedded within the source code of the webpage 105 by a content server (content provider) 300 of the webpage 105. In another embodiment, the annotation processor script 105T is installed on the browser of the client 100 and is made available to any webpage 105 rendered on the client 100. A servlet within server 200 receives the request from the client 100 and forwards the request to a server-side component in the form of Annotations Persistence Store (APS) 210 on the server 200. The APS 210 interacts with the content server 300 and the Annotations server 215 to receive content and any annotations associated with the content of the requested webpage 105 respectively and forwards the content and the annotations to the client 100 through the servlet.

If no annotations are available for the content of the requested webpage 105, the content of the requested webpage 105 is returned to the client 100. The content of the requested webpage 105 is rendered on the client 100. An annotation tool made available at the client 100 is invoked upon rendering of the webpage 105 at the client 100. The annotation tool provides annotation options for creating and sharing new annotations to content of the requested webpage 105. The newly created annotations can be shared with a group of users by providing access to the annotations using a share option on the annotation tool.

If annotations are available for the content of the requested webpage 105, the content of the requested webpage 105 and the annotations associated with the content of the requested webpage 105 are linked together and returned by APS 210 as a "Shareable URL", to the client 100. The annotated webpage is rendered at the client 100. An annotation processor script 105T embedded in the source code of the annotated webpage or available on the client 100 provides a user with the ability to view existing annotations. An annotation tool within the annotation processor script 105T available at the client 100 maybe invoked upon rendering of the annotated webpage. The annotation tool provides annotation options for creating additional annotations or modifying and sharing existing annotations to the content of the webpage 105. New annotations and modified annotations are saved on an annotations server 215 for later retrieval, upon commitment at the client 100. These annotations are transmitted by the client 100 and saved on the annotations server 215 using the servlet and APS 210 on server 200.

Allowing a user to add or modify annotations to any portion of a webpage 105 will provide others who may wish to view or discuss portions of a webpage 105 an efficient collaboration mechanism during critical development and/or launch of a webpage 105. This collaboration mechanism is especially useful when the users are geographically distant from one another but are accessible over the Internet.

It is noteworthy that the present invention is not limited to the architecture of FIG. 1. For example, hand-held computers, notebook or laptop computers, set-top boxes or any other computing system (wired or wireless) capable of connecting to the Internet and running computer-executable process operations, as described below, may be used to implement the various aspects of the present invention. Additionally, the software program, in general, should be viewed as pieces of code, and such code can be written in other languages so long as its functionality enables the process operations of the present invention.

Figure 2:
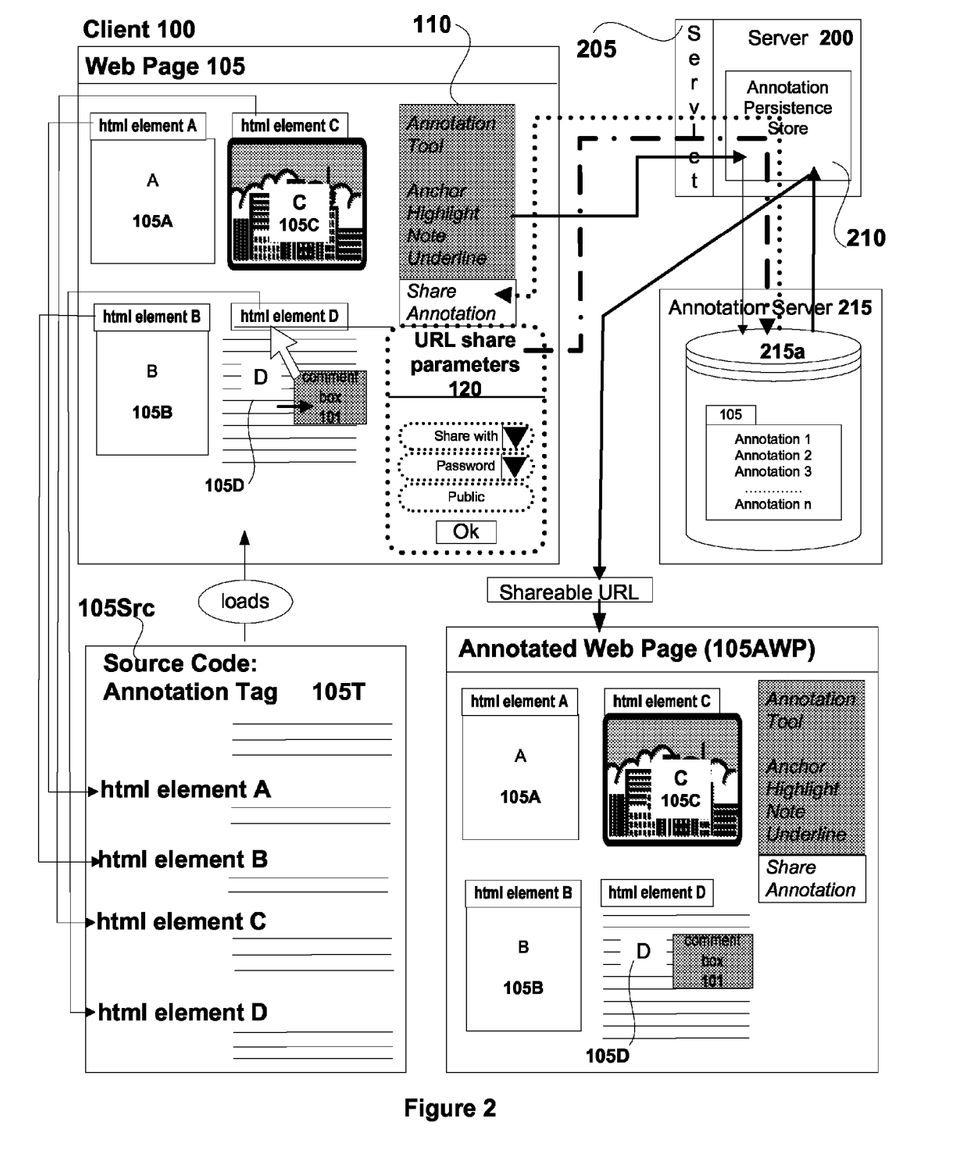
FIG. 2 illustrates the various elements of the client-server computing system involved in adding an annotation to a portion of a content of the webpage on a client, in one embodiment of the invention.

FIG. 2 illustrates a block diagram that provides a more detailed view of various operations and resources of the client-server system involved in carrying out the process operations in one embodiment of the invention.

In the current application, browser, browser client and client are used interchangeably to refer to a client in a client-server computing system. A client is a computer or computing device that runs client software (referred to as a browser) to access the Internet.

The process details a technique for adding annotations to a portion or portions of content of a webpage 105. A JavaScript running on the server 200 and on the client 100 handle rendering and updating of the annotations and also provide options for allowing sharing of annotations with specific users. In an embodiment, specific annotations applied to a portion of content of a webpage 105 is linked to a particular HTML element which may be in location proximity to the portion of the content of the webpage 105 being annotated. During the update or addition process, the user can drag the annotation or associate the annotation to portions having an HTML element.

FIG. 2 illustrates the various operations and resource details that are involved in carrying out the process operations of the current invention. The process begins with a user requesting a webpage 105 on the client 100. The webpage 105 requested by a client 100 may include content having various portions (example: types of data) such as a text portion, a picture portion, a Graphic User Interface (GUI) portion, a video portion, an audio portion or any combinations thereof. It should be noted that the portions of contents of a webpage 105 are not restricted to the ones listed above but may contain other forms so long as they may be rendered on a webpage 105 and accessed.

The requested webpage 105 contains, among other codes and data, JavaScript to enable rendering of the webpage 105 on the client 100. The JavaScript includes source code 105SRC, that may manipulate the HTML elements of page, alter the style, or format the appearance when rendering different portions of content on the webpage 105. As illustrated in FIG. 2, HTML element A is associated with portion A 105A, HTML element B is associated with portion B 105B, HTML element C is associated with portion C 105C, HTML element D is associated with portion D, and so on. In one embodiment, an annotation processor script 105T is included in the source code of the webpage 105. The annotation processor script 105T is code developed in JavaScript, Java applet or a custom script that enables a user to add, modify and view annotations on that particular webpage 105, when the annotation processor script 105T is present. In one embodiment, a server in the form of content server 300 hosts or publishes the webpage 105. The webpage 105 hosted or published by the content server 300 incorporates the annotation processor script 105T in the source code of the webpage 105 during the initial development of the webpage 105 or adds it to the webpage 105 on demand. In another embodiment, the annotation processor script 105T may be installed on the client 100 and made available to any webpage 105 rendered on the client 100.

Initially, a user may wish to begin the process of sharing an annotation by first adding an annotation to some content of a webpage 105. To accomplish this, the client 100 requests a webpage 105 from a server 200. In this embodiment, for example, the webpage 105 requested by the client 100 does not have any annotations associated with any content of the webpage 105. A servlet 205 on the server 200 receives the request and forwards the request to an Annotations Persistence Store (APS) 210 on the server 200. The APS 210 interacts with a content server 300 to receive the content of the webpage 105. The webpage 105 requested in this embodiment does not contain any annotations. The webpage 105 is rendered on the client 100 using the JavaScript from the source code 105SRC associated with the webpage 105.

To add an annotation, a user accesses an annotation tool available at the client 100. In one embodiment of the invention, an annotation processor script 105T is installed on or is associated with the browser and the user may access the annotation tool 110 made available by the annotation processor script 105T from the browser's menu or an extension thereof. The annotation tool is shown in FIG. 2 as annotation tool 110. The annotation tool 110 provides various annotation options available to the user for adding annotations to a content of the webpage 105. For simplicity, the user might consider adding an annotation, such as a comment, to content D of the webpage 105 rendered on the client 100 in FIG. 2. In this case, the user selects a portion of content D that has to be annotated and then clicks on the "Note" option on the annotation tool 110. The annotation tool 110 may provide a text box to add notes, such as comment box 101, in response to the "Note" option selection and allows the user to add comments related to the selected portion of the content of the webpage 105, in the comment box 101. A unique key is associated with the newly created annotations for the webpage 105. The user then applies the "Note" annotation to the selected portion of content D of the webpage 105 by dragging the comment box 101 to HTML element D and establishing an association between a HTML element and an annotation as shown in FIG. 2. By applying the annotation to the HTML element D, the annotation is associated with the contents of the webpage 105 belonging to HTML element D and every time the page is rendered on the client 100, the annotation associated with the content of HTML element D is rendered at the client 100 along with the content of the HTML element D.

The newly created annotation on the selected portion of the content of the requested webpage 105 rendered on the client 100 may then be shared with other users or with a select group of users. In one embodiment, the sharing of the newly created annotations can be made possible by selecting the appropriate share parameter option 120 on the annotation tool 110 and providing one or more share parameters. The share parameters identify the list of users that are allowed to view the annotations associated with the content of the webpage 105 and the key identifying the annotations that these users are allowed to view. Upon entry of the share parameters, the newly created annotations, the data associated with the newly created annotations and the associated share parameters are saved by server 200 as a "sharable URL." A servlet 205 on the server 200 receives the save request and forwards the request to the APS 210. APS 210 saves the annotations associated with the content of the requested webpage 105, the data and the related share parameters associated with the annotations in an annotations database 215a on the annotations server 215. The shareable URL could be forwarded to the users that are allowed to view the annotations.

A sharable URL is a link, for the annotated webpage 105AWP, that can be accessed by all or by an authorized group of users based on the share parameters. The link is established by associating the data related to the annotation with the source code of the web page 105. An annotation processor script 105T associated with the annotation is applied to the source code 105SRC of the webpage 105AWP to enable viewing of the annotation.

In one embodiment of the invention where the content of the webpage 105 associated with the annotations has remained the same on the content server 300, the sharable URL would link the annotations from the annotations server 215 with the associated content of the webpage 105 from the content server 300 (based on the data in the annotations server 215). The source code 105SRC for the webpage renders the content of the webpage 105 on the client 100 and the annotation processor script 105T applies the annotations associated with the webpage 105 generating an annotated webpage 105AWP to enable appropriate users to view, modify and add annotations associated with the content of the annotated webpage 105AWP.

Upon adding an annotation to a webpage 105, one or more users can request to view the annotation associated with the webpage 105. When a request for an annotated webpage 105AWP is made from the client 100, the initial content of the webpage 105 is loaded. A content server 300 may be used to obtain contents of the webpage 105 requested by the client 100. The webpage 105 containing the annotated content includes a link to a client side annotation processor script 105T which, once initialized in the JavaScript runtime, manages the annotations in the webpage 105. The annotation processor script 105T uses XMLHttpRequest calls to interact with an Annotation Persistence Store (APS) 210, a JavaScript script resident on the server 200. A servlet 205 on the server 200 receives the request from the client 100 and forwards it to the APS 210. The APS 210 interacts with an annotations server 215 to receive annotation meta data associated with the webpage 105. The annotation meta data associated with the webpage 105 are in the form of JavaScript scripts or XML documents. The annotation meta data are applied to the webpage 105 using annotation processor script 105T generating a link to an annotated webpage 105AWP. The link to the annotated webpage 105AWP with annotations is provided as a "Sharable URL" that can be accessed by anyone authorized to view the annotations. It is to be noted that the contents of the webpage 105 on the content server 300 associated with the annotations have remained the same from the time the annotations were applied to the time a user requests to view the applied annotations. The annotations that are associated with specific portions of the annotated webpage 105AWP can now be shared amongst the authorized group of users. Of course, any number and type of annotations can be present on the annotated webpage 105AWP.

The term "XMLHttpRequest" was used above to define functionality regarding methods in accordance with one embodiment of the present invention. Although the format of the request should not limit the scope of the method, it should be noted that XMLHttpRequest is not part of ECMAScript standard. However, XMLHttpRequest is, in some respects, becoming a defacto standard that is commonly supported by currently available browsers. Of course, XMLHttpRequest may be standardized in the future, and it is known that the XMLHttpRequest may be standardized as part of a future rendition of World Wide Web Consortium standards.

The annotation meta data is returned by the APS 210 to the client 100 through the servlet 205 of the server 200. The annotation processor script 105T on the client 100 receives the annotation meta data, evaluates the annotation meta data and renders the webpage as an annotated webpage 105AWP on the client 100, in response to the webpage 105 request. The annotation processor script 105T available to the annotated webpage 105AWP at the client 100 allows the user to modify, add and view the annotations associated with portions of the annotated webpage 105AWP, when authorized.

An annotation tool 110 available to the annotated webpage 105AWP through the annotation processor script 105T provides annotation options for adding, updating, deleting or re-associating annotation(s) using one or more annotation options. Annotation options available through the annotation tool 110 provide different ways to visually mark a selected portion of a webpage 105 or provide text box option on which to record comments or criticisms about a selected portion of the webpage 105. Some of the annotation options to visually mark a selected portion of the webpage 105 or record comments that may be available on the client 100 may include Underline, Highlight, Anchor or Notes. It should be noted that the annotation options are not restricted to the ones listed above and that others may be included depending on the requirements and availability of such options.

Annotations can be added to the webpage 105 in one of two ways. In one embodiment, an annotation is added to a webpage 105 rendered on the client 100 by first identifying and selecting a portion of the content of the webpage 105 that needs to be annotated. An annotation option is then selected from an annotation tool 110 available to the webpage 105 and applied to the identified portion by associating the annotation option to a HTML element to which the identified portion of the content of the webpage 105 belongs. The annotation option so chosen provides visual marking to the identified portion of the content when applied and may include one of Highlight, Underline or Anchor.

In another embodiment, an annotation is added to a webpage 105 rendered on the client 100 by first identifying and selecting a portion of the content of the webpage 105 that needs to be annotated. An annotation option is then selected from an annotation tool 110 available to the webpage 105. A text box in the form of a comment box 101 is provided upon selection of the annotation option which enables a user to add comments or notes related to the selected portion of the content of the webpage 105. The comment box 101 is linked to the selected portion of the content of the webpage 105 by dragging and associating the comment box 101 to a corresponding HTML element to which the selected portion of the content belongs. The annotation option so chosen provides textual comments to the identified portion and may include option such as Note. The comment box 101 also provides the ability for a plurality of users to view and update the contents of the comment box 101, depending on the share parameters. The annotation, in this embodiment, is transferable. The annotation can be transferred by re-associating the annotation to a different portion of content under a different HTML element. The annotation can be re-associated by identifying a different portion of content and manually dragging the annotation and linking it to a new HTML element to which the identified portion belongs. In the case where the annotation is re-associated, the old association is deleted and the new association is activated. These updates are saved to annotations server 215 for future reference.

The annotation processor script 105T available on the webpage 105 rendered on the client 100 helps in tracking the location and position of the annotations in relation to a HTML element the annotation is associated with, and dynamically changing the visual representation of a selected content of the webpage 105 associated with the annotation, without refreshing the whole page. The annotation processor script 105T uses asynchronous communications for communicating meta data concerning the annotations including position data and associations with HTML elements with the Servlet 205 and APS 210 on the server 200 thereby providing a rich user interface. The client 100 also provides a graphic user interface (GUI) and a display device (not shown) connected to the client 100 for displaying annotated webpage 105AWP that includes an annotation.

Some of the options that may be available under share parameter option 120 to enable sharing of annotations, are share identification including annotation identification, private access, private access password and public access. The share parameters may include name, group name, Email address, annotation URL, private access, private access password, public access, annotator identifier, webpage identifier and annotation data which further may include HTML element associated with the identified portion, annotation type, and annotation content. The annotation type could be the annotation option that is used in providing the annotation such as Highlight, Anchor, Underline, Note to name a few examples.

Figure 3:
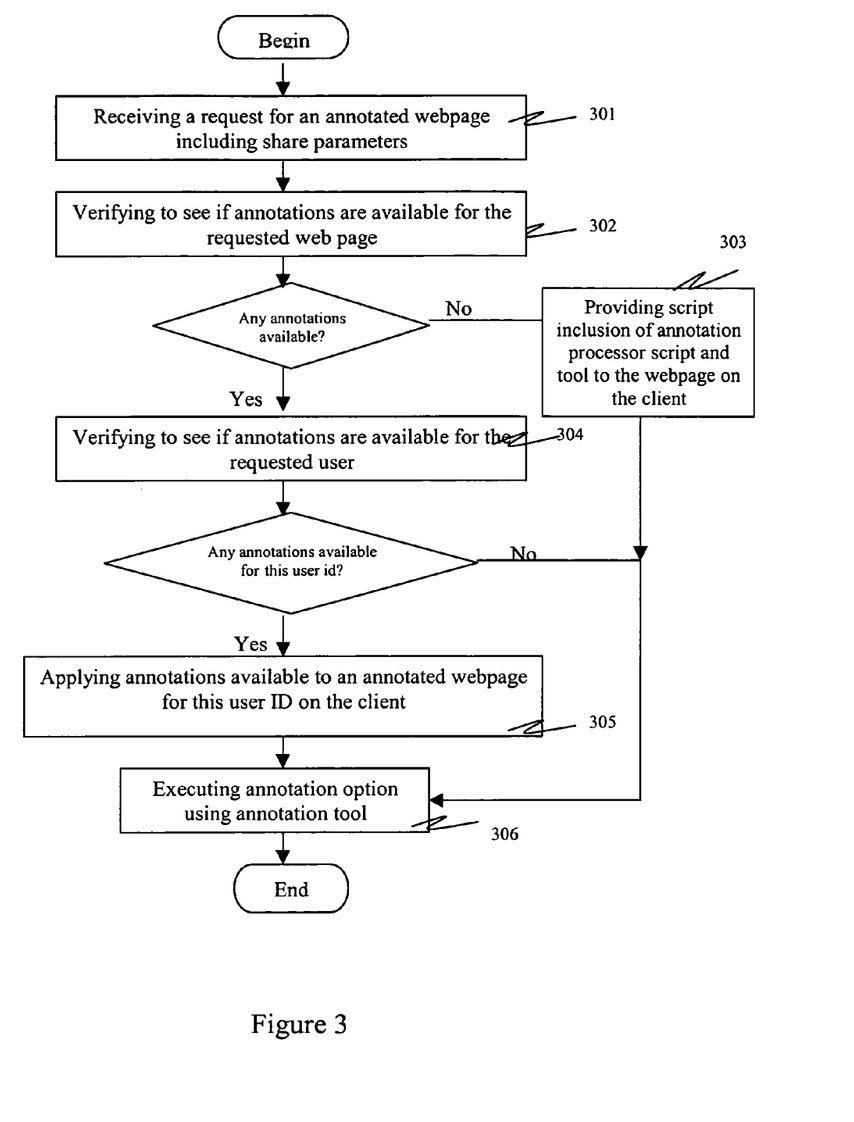
FIG. 3 illustrates the operations involved in adding an annotation to a content of the webpage, in one embodiment of the invention.
Figure 4:
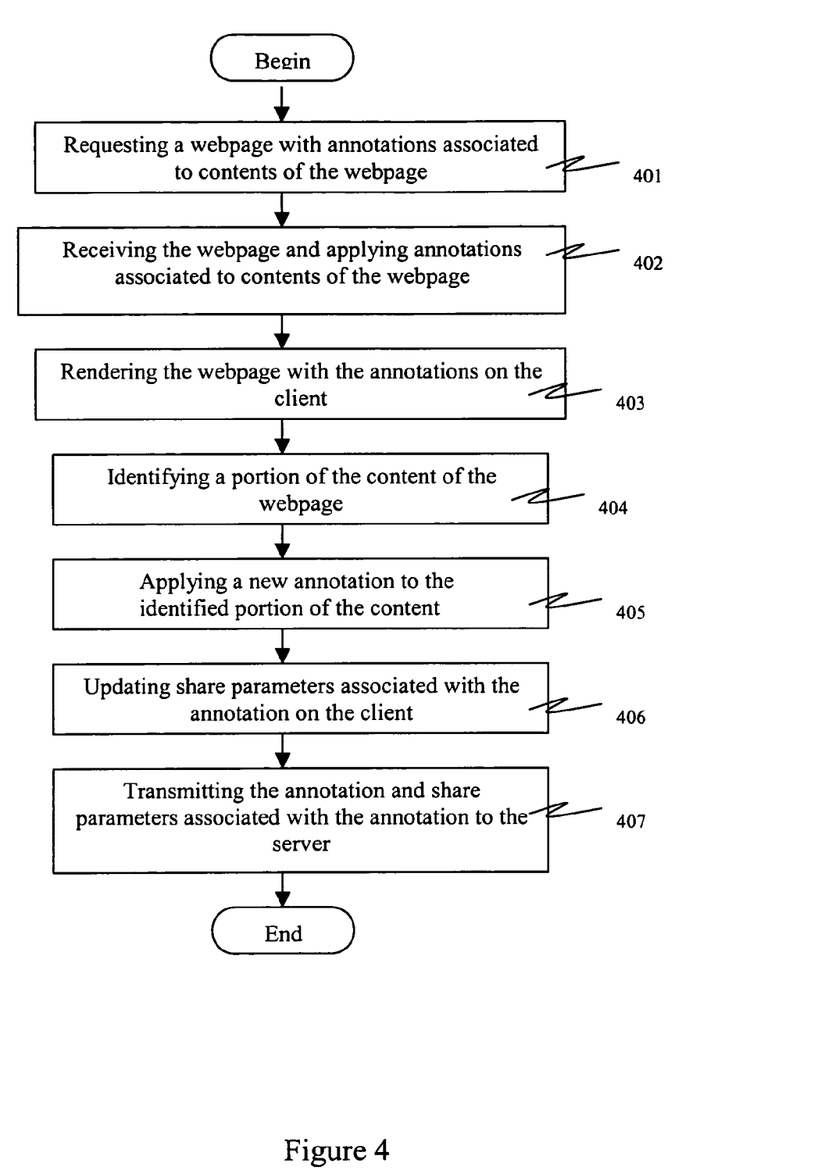
FIG. 4 illustrates the client-side operations involved in adding an annotation to a content of the webpage, in one embodiment of the invention.
Figure 5:
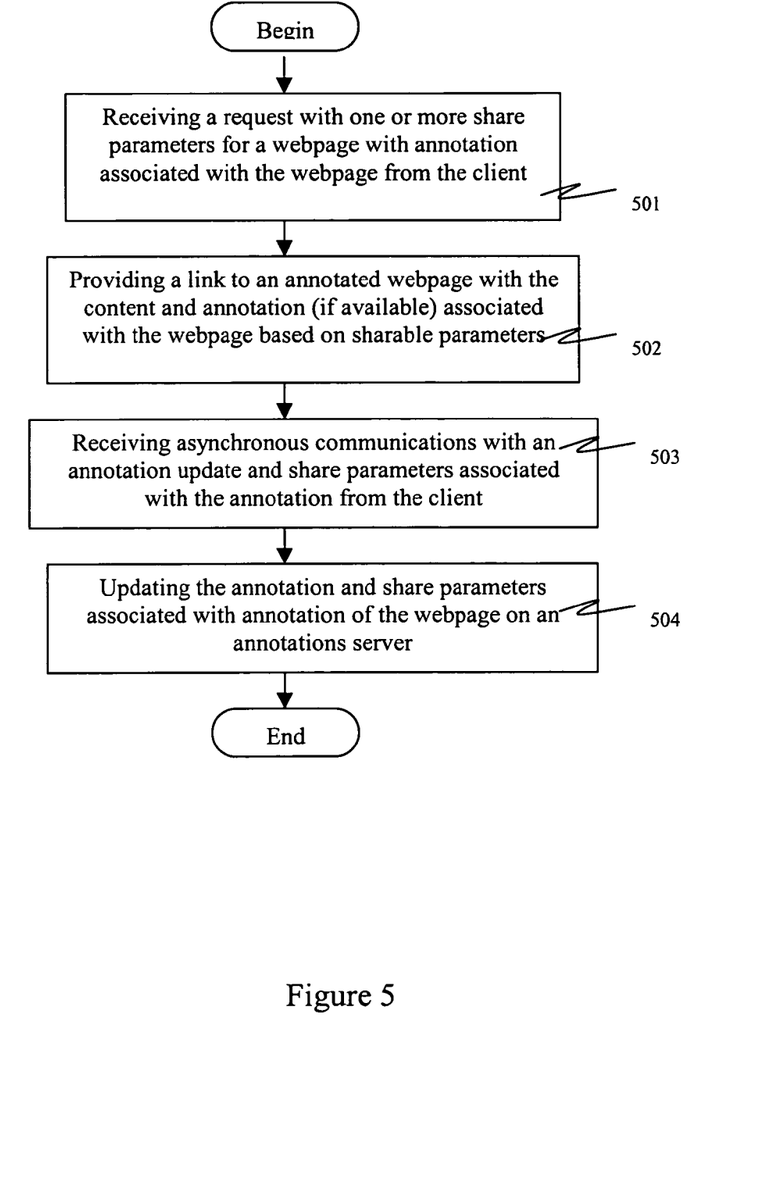
FIG. 5 illustrates the server-side operations involved in adding an annotation to a content of the webpage, in one embodiment of the invention.
Figure 6:
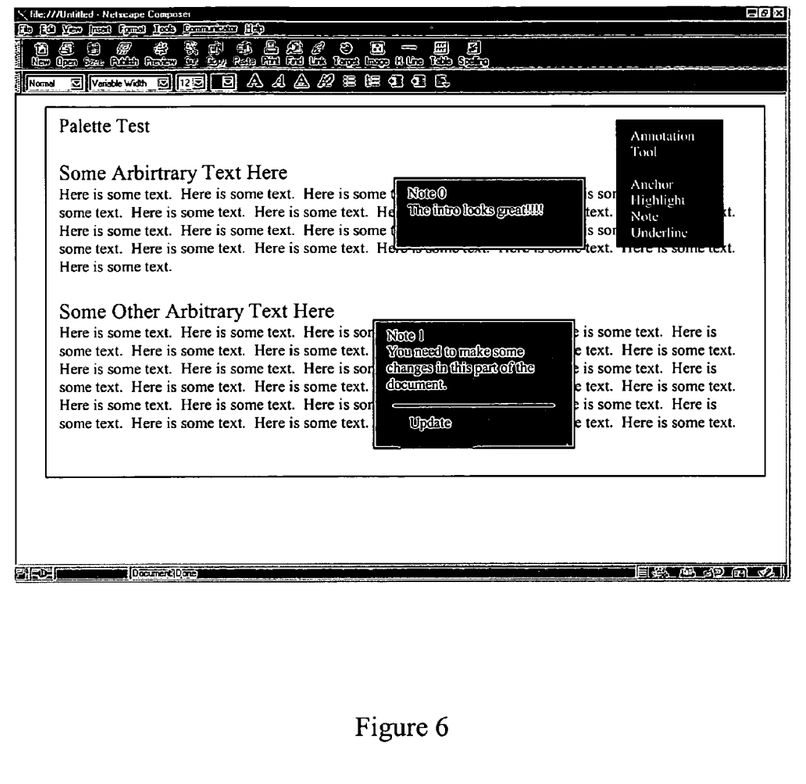
FIG. 6 illustrates a screen shot of a webpage with two annotations each associated with a different content of a webpage rendered on the client, in one embodiment of the invention.

The method for providing annotations on a webpage 105 is now described in detail with reference to flow charts illustrated in FIGS. 3, 4, and 5. FIG. 3 illustrates the process operation involved in one embodiment of the invention. FIG. 4 illustrates the client-side operations involved in one embodiment of the invention. FIG. 5 illustrates the server-side operations involved in one embodiment of the invention.

The method begins at the client 100 when a webpage 105 is requested by a user, as shown in operation 301 of FIG. 3. The request from the client 100 could include a key such as an address to a server 200 in the form of a Uniform Resource Locator (URL) along with a plurality of share parameters that are used in identifying the annotated webpage 105AWP. An annotation processor script 105T running on the client 100 receives the share parameters and manages the annotations on the client 100 by using the URL from the request and routes this and subsequent requests for annotation related meta data to the server 200 in the form of an XMLHttpRequest call.

The request is received by a servlet 205 on the server 200 and forwarded to an Annotation Persistence Store (APS) 210 on the server 200. APS 210 queries an annotations server 215 for any annotations available for the requested webpage 105, as illustrated in operation 302 of FIG. 3. The content for the webpage 105 is loaded from a server such as a content server 300 and the webpage 105 is rendered at the client 100. If there are no annotations available for the requested webpage 105, an annotation processor script 105T that includes an annotation tool 110 is made available to the webpage 105 on the client 100, as illustrated in operation 303 of FIG. 3. The annotation tool 110 provides a plurality of annotation options for adding annotations to content of the webpage 105. New annotations can now be applied to any portion of the content of the webpage 105 rendered on the client 100 by executing one or more annotation options provided in the annotation tool 110, as illustrated in operation 306 of FIG. 3. A unique key will be associated with the new annotations applied to the webpage 105. The unique key defines some of the share parameters associated with the new annotated webpage 105AWP.

In operation 304, the APS 210 checks to see if the requester (user) of the webpage 105 has access to the sharable URL by verifying one or more share parameters passed in the request received from the client 100 against the share parameters stored with the annotations associated with the webpage 105 in the annotations server 215. If the requester does not have access to view the annotations for that page a corresponding message will be presented to the client 100. The webpage 105 without annotations is rendered at the client 100. If the requester is permitted to see the annotations, the APS 210 will retrieve the corresponding annotation meta data from the annotations server 215 and return the annotation meta data as an XML document or JavaScript scripts to the annotation processor script 105T at the client 100 for rendering. The annotation processor script 105T will evaluate and apply the annotation meta data to the webpage 105 generating the annotated webpage 105AWP.

The rendered annotated webpage 105AWP can be shared using a sharable URL. The annotated webpage 105AWP is rendered at the client 100 using the JavaScript code 105SRC and the annotation processor script 105T. The annotation processor script 105T will also provide an annotation tool 110 at the client 100 to manage annotations on annotated webpage 105AWP. New annotations can now be added or existing annotations updated to any portion of the content of the annotated webpage 105AWP rendered on the client 100 by executing one or more annotation options provided in the annotation tool 110, as illustrated in operation 306 of FIG. 3 and a new link generated.

FIGS. 4 and 5 illustrate the operations involved at the client-side and server side. FIG. 4 illustrates the client-side operations and FIG. 5 illustrates the server-side operations involved in one embodiment of the invention. The process begins at the client-side when a webpage 105 with annotations associated with content of the webpage 105 is requested at the client 100, as illustrated in operation 401 of FIG. 4. The request from the client 100 could include a parameter such as an address to a server 200 in the form of a Uniform Resource Locator (URL) along with a plurality of other share parameters including a key identifying a set of annotations that are used in identifying the annotated webpage 105AWP. An annotation processor script 105T running on the client 100 communicates with the APS 210 on the server 200 by using the URL from the request and routing this and subsequent requests to the server 200 in the form of an XMLHttpRequest calls.

The annotation processor script 105T retrieves the annotated meta data for the corresponding key that was provided as a parameter with the URL to retrieve the webpage 105. The annotation processor script 105T on the client 100 uses the meta data retrieved from the server 200 to apply annotations to the webpage 105 generating an annotated webpage 105AWP. The annotation processor script 105T also provides an annotation tool 110 to enable one or more annotations to be added to content of the webpage 105. New annotations can be created or existing annotations modified, deleted or re-associated on the annotated webpage 105AWP at the client 100 using the available annotation tool 110. Annotations can be added by first identifying a portion of the content of the annotated webpage 105AWP that needs to be annotated, as illustrated in operation 404 of FIG. 4. An annotation option is selected from the annotation tool 110 and applied to the identified portion by associating the annotation to a HTML element to which the identified portion of the content of the annotated webpage 105AWP belongs, as illustrated in operation 405 of FIG. 4. Applying annotation to an identified portion may also include adding or modifying existing annotations. In case where the annotation includes a comment box 101, annotation may be added by updating the contents in an existing comment box 101 or a new comment box 101 can be added, associating the new comment box 101 with a HTML element to which the identified portion belongs. Upon applying one or more annotation to portion(s) of content of the annotated webpage 105AWP an update request is initiated. In one embodiment, the annotation tool 110 running on the client 100 provides a share parameter option 120 on the client 100 in response to the update request. The share parameter option 120 provides a plurality of share parameters available for enabling sharable access to the annotations on the webpage 105, as illustrated in operation 406 of FIG. 4. The meta data for the annotations including the share parameters are transmitted to the server 200 using an asynchronous communication, in response to the update request initiated at the client 100, as illustrated in operation 407 of FIG. 4. The client-side operations conclude with the update request to the server 200.

The server-side operation begins with a request for a webpage 105 with one or more annotations associated with the webpage 105. The request, which includes a plurality of share parameters, is received at a servlet 205 on server 200 to which client 100 is mapped. The share parameters include a key such as an URL to link the request from the client 100 to the server 200. The servlet 205 forwards the request to an APS 210 on the server 200. An Annotation Persistence Store (APS) 210 obtains content for the webpage 105 from a server such as a content server 300 and annotations from an annotations server 215, in response to the request received from the client 100. The APS 210 retrieves the annotation metadata including a key or unique identifier representing the annotations applied to the webpage 105 and returns the link to the client 100 through the servlet 205 on the server 200, as illustrated in operation 502 of FIG. 5. The metadata retrieved by the APS 210 is applied to the webpage 105 rendered on the client using annotation processor script 105T generating an annotated webpage 105AWP which includes one or more annotations associated with the content of the webpage 105 if the share parameters provide access to such annotations.

An annotation tool 110 included in the annotation processor script 105T available at the client 100 enables addition or modifications of annotations to content of the webpage 105AWP by providing annotation options. When an annotation is added or modified on the webpage 105AWP at the client 100, an update request is initiated at the client 100. In one embodiment, the update request includes a plurality of share parameters associated with one or more annotations applied to one or more portions of content on the webpage 105. The update request with share parameters associated with the annotation applied to a content of the webpage 105AWP, is forwarded to the APS 210 on the server 200 for updating the annotations server 215, in an asynchronous communication, as illustrated in operation 503 of FIG. 5. The APS 210 receives the asynchronous communication and forwards the annotations and share parameters including the unique key associated with the annotations in the webpage 105 to the annotations server 215 for update, as illustrated in operation 504 of FIG. 5. The process concludes when APS 210 generates a link and returns the link in the form of a sharable URL to the client 100 upon completion of the update, in response to the update request. The sharable URL can be shared with authorized users upon request.

The invention can also be embodied as a system with a server 200 connected to a client 100. The server includes a servlet 205 that receives requests from the client 100 and forwards the requests to a server-side component on the server 200. The server 200 also includes a server-side component in the form of an Annotations Persistence Store (APS) 210 to request and receive content for a webpage 105, and an annotations server 215, to store and retrieve annotations and share parameters associated with the content of the webpage 105. The APS 210 is implemented as a Java based server side component. The client 100 includes a JavaScript script in the form of an annotation processor script 105T that enables annotations to be added, modified and viewed on the webpage 105. The annotation processor script 105T may be installed on the browser and made available to any webpage 105 rendered on the client 100 or the annotation processor script 105T can be included in the source code of the webpage 105 that is rendered on the client 100. An annotation tool 110 is available to the webpage 105 through the annotation processor script 105T. The annotation processor script 105T is capable of tracking the location and position of the annotations in relation to a HTML element the annotation is associated with, and dynamically changing the visual representation of a content of the webpage 105 associated with the annotation without refreshing the whole page. The annotation processor script 105T uses asynchronous communications for communicating with the servlet 205 and APS 210 to which the client 100 is linked. The client 100 and server 200 are connected and communicate using network (not shown). The client 100 also provides a graphic user interface and a display device (not shown) connected to the client 100 to render and view the annotations associated with the webpage 105.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be obvious, however, to one skilled in the art, that the present invention may be practiced without some or all of these specific details. In other instances, well known process operations have not been described in detail in order not to unnecessarily obscure the present invention.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for adding annotations to content of a webpage provided by a content server, comprising:

identifying a portion of the content of the webpage;

applying an annotation to the identified portion of the content by associating the annotation to an element defining the identified portion of the content of the webpage, wherein the webpage includes one or more elements defining the contents within the webpage, wherein the element is a webpage element that defines location and rendering style of the content on the webpage and the association is enabled by graphically moving the annotation in close proximity to the element defining the identified portion;

saving the annotation and its association with the element defining the identified portion on an annotations server, wherein the applied annotation and data defining the element are saved on the annotations server independently from the webpage;

dynamically changing visual representation of the identified portion of the content of the webpage associated with the annotation, the change in visual representation indicative of a presence of annotation at the identified portion of the content of the webpage; and generating a link to an annotated webpage, wherein the annotated webpage includes contents obtained from the content server and the annotation meta data for the annotation associated with the element defining the identified portion from the annotations server, wherein the link to the annotated webpage provides access to view the webpage with the annotation, wherein the link is sharable to enable accessing and viewing by others of the annotation being associated with the identified portion of the content, wherein the annotation is transferable from the identified portion of the content of the webpage to a second portion of the content of the webpage, the second portion of the content defined by a second element that is distinct from the element defining the identified portion, the transferring of annotation includes, graphically moving the annotation from the identified portion of the content of the webpage to a location in close proximity to the second portion of the content, the graphical movement resulting in disassociation of the annotation from the element defining the identified portion and application of the annotation to the second portion of content by re-associating the annotation to the second element of the webpage.

2. The method for adding annotations to content of a webpage provided by a content server of claim 1, wherein the portion is one of a text portion, a picture portion, a GUI portion, a video portion, an audio portion.

3. The method for adding annotations to content of a webpage provided by a content server of claim 1, further includes managing the annotations associated with the webpage, the managing of the annotations includes addition, deletion, and updating of the annotations, the updating of the annotations includes the transferring of annotation, the updating of the annotation further includes, saving the annotation and its re-association with the second element in the annotations server; and dynamically changing visual representation of both the first portion and the second portion of the content of the webpage associated with the annotation, the change in visual representation of the first portion indicative of an absence of the annotation at the first portion of the content of the webpage due to the removal of the association of the annotation with the element and the change in visual representation of the identified second portion indicative of a presence of annotation at the identified second portion of the content of the webpage;

wherein the annotated webpage reflects the change in the association of the annotation at the first portion and the second portion of the content of the webpage.

4. The method for adding annotations to content of a webpage provided by a content server of claim 1, wherein the annotation is a text box.

5. The method for adding annotations to content of a webpage provided by a content server of claim 1, wherein the annotation is associated with the identified portion by selecting the identified portion and applying the annotation to the identified portion.

6. The method for adding annotations to content of a webpage provided by a content server of claim 5, wherein the annotation is one of an underline, a highlight or an anchor.

7. The method for adding annotations to content of a webpage provided by a content server of claim 1, wherein saving the annotation further including:

associating a unique key to a set of annotations defined on the webpage.

8. The method for adding annotations to content of a webpage provided by a content server of claim 1, further includes, receiving one or more share parameters associated with the annotation, wherein the share parameters define accessibility of a select set of annotations defined on the webpage to one or more users; and saving the share parameters along with the annotation on the annotations server, wherein the share parameters used in restricting access to the select set of annotations to the one or more users, wherein the share parameters include any one or more of name, group name, Email address, annotation URL, private access, private access password, public access, annotator identifier, webpage identifier and annotation data, wherein annotation data further includes the element associated with the identified portion, annotation type, annotation content.

9. The method for adding annotations to content of a webpage provided by a content server of claim 1, wherein the link is generated at the server in response to one or more asynchronous communications and is based on one or more share parameters, the server executing a script.

10. A computer implemented method for enabling addition of annotations to content of a webpage provided by a content server, comprising:

enabling application of an annotation to an identified portion of the content by associating the annotation to an element defining the identified portion within the content of the webpage, wherein the webpage includes one or more elements defining the contents of the webpage, wherein the element is a webpage element that defines location and rendering style of the content on the webpage and the association is enabled by graphically moving the annotation in close proximity to the element defining the identified portion;

upon application of the annotation, causing the annotation and its association with the element defining the identified portion to be saved on an annotations server, wherein the applied annotation and data defining the identified portion are saved on the annotations server independently from the webpage;

dynamically changing visual representation of the identified portion of the content of the webpage associated with the annotation, the change in visual representation indicative of a presence of annotation at the identified portion of the content of the webpage; and generating a link to an annotated webpage, the annotated webpage includes content obtained from the content server and the annotation associated with the element of the identified portion obtained from the annotations server, wherein the link to the annotated webpage provides access to view the webpage with the annotation, wherein the link is sharable to enable accessing and viewing by others of the annotation associated with the identified portion of the content and wherein the annotation is transferable from the identified portion of the content of the webpage to a second portion of the content of the webpage, the second portion of the content defined by a second element that is distinct from the element defining the identified portion, the transferring of annotation includes, graphically moving the annotation from the identified portion of the content of the webpage to a location in close proximity to the second portion of the content, the graphical movement resulting in disassociation of the annotation from the element defining the identified portion and application of the annotation to the second portion of content by re-associating of the annotation to the second element of the webpage.

11. The computer implemented method for enabling addition of annotations to content of a webpage provided by a content server of claim 10, wherein enabling application of an annotation is by providing an annotation processor script on the webpage, the annotation processor script enabling communication of metadata associated with one or more annotation, wherein the annotation processor script makes one or more asynchronous requests for annotation meta data.

12. The computer implemented method for enabling addition of annotations to content of a webpage provided by a content server of claim 10, wherein the annotation is a text box.

13. The computer implemented method for enabling addition of annotations to content of a webpage provided by a content server of claim 10, further includes managing the annotation associated with the webpage, the managing of the annotations includes addition, deletion, and updating of the annotations, the updating of the annotations includes the transferring of annotation, the updating of the annotation further includes, saving the annotation and its re-association with the second element in the annotations server; and dynamically changing visual representation of both the first portion and the second portion of the content of the webpage associated with the annotation, the change in visual representation of the first portion indicative of an absence of the annotation at the first portion of the content of the webpage due to the removal of the association of the annotation with the element and the change in visual representation of the identified second portion indicative of a presence of annotation at the identified second portion of the content of the webpage;

wherein the annotated webpage reflects the change in the association of the annotation at the first portion and the second portion of the content of the webpage.

14. The computer implemented method for enabling addition of annotations to content of a webpage provided by a content server of claim 10, wherein saving the annotation on an annotations server further including:

receiving one or more share parameters associated with the annotation, wherein the share parameters define accessibility of the annotation for one or more users; and saving the share parameters associated with the annotation along with the annotation on the annotations server based on an unique identifier, wherein the share parameters and the unique identifier used in restricting access to the annotation to the one or more users.

15. The computer implemented method for enabling addition of annotations to content of a webpage provided by a content server of claim 10, wherein the link is generated at the server in response to one or more asynchronous communications and is based on one or more share parameters, the content server executing a server side component.

16. A system for implementing addition of annotations to content of a webpage provided by a content server, comprising:

a client device configured to execute an annotation processor script, the annotation processor script capable of:

identifying a portion of the content of the webpage;

applying an annotation to the identified portion of the content by associating the annotation to an element defining the identified portion of the content of the webpage wherein the webpage includes one or more elements defining the contents within the webpage, the element being a webpage element that defines location and rendering style of the content on the webpage and the association is enabled by graphically moving the annotation in close proximity to the element defining the identified portion;

transmitting the annotation associated with the element defining the identified portion of the content to a server; and the server equipped with an annotation persistence program, the annotation persistence program configured to receiving the annotation associated with the element defining the identified portion of the content of the webpage transmitted by the client;

saving the annotation and its association with the element defining the identified portion on an annotations server, wherein the applied annotation and data defining the identified portion are saved on the annotations server independently from the webpage;

dynamically changing visual representation of the identified portion of the content of the webpage associated with the annotation, the change in visual representation indicative of a presence of annotation at the identified portion of the content of the webpage; and generating a link to an annotated webpage, the annotated webpage includes content obtained from the content server and the annotation for the annotation associated with the element of the identified portion obtained from the annotations server, wherein the link to the annotated webpage provides access to view the webpage with the annotation, wherein the link is sharable to enable accessing and viewing of the annotation associated with the identified portion by others, wherein the annotation is transferable from the identified portion of the content of the webpage to a second portion of the content of the webpage, the second portion of the content defined by a second element that is distinct from the element defining the identified portion, the transferring of annotation includes, graphically moving the annotation from the identified portion of the content of the webpage to a location in close proximity to the second portion of the content, the graphical movement resulting in disassociation of the annotation from the element defining the identified portion and application of the annotation to the second portion of content by re-associating the annotation to the second element of the webpage.

17. The system for implementing addition of annotations to content of a webpage provided by a content server of claim 16, wherein the annotation processor script is further capable of communicating a plurality of share parameters associated with the annotation; and wherein the annotation persistence program is capable of generating the link to the annotated webpage based on the share parameters received.

* * * * *